(12) United States Patent
Lehtinen

(10) Patent No.: US 7,576,688 B2
(45) Date of Patent: Aug. 18, 2009

(54) METHOD AND ARRANGEMENT FOR DETECTING MOVING OBJECTS WITH A RADAR

(75) Inventor: Markku Sakari Lehtinen, Sodankylä (FI)

(73) Assignee: Eigenor Oy (FI)

( * ) Notice: Subject to any disclaimer, the term of this patent is extended or adjusted under 35 U.S.C. 154(b) by 0 days.

(21) Appl. No.: 11/884,720

(22) PCT Filed: Feb. 20, 2006

(86) PCT No.: PCT/FI2006/000059

§ 371 (c)(1),
(2), (4) Date: Aug. 7, 2008

(87) PCT Pub. No.: WO2006/087421

PCT Pub. Date: Aug. 24, 2006

(65) Prior Publication Data

US 2009/0009385 A1    Jan. 8, 2009

(30) Foreign Application Priority Data

Feb. 21, 2005    (FI)    ................................. 20050205

(51) Int. Cl.
*G01S 13/72*    (2006.01)

(52) U.S. Cl. ........................... 342/196; 342/90; 342/95; 342/96; 342/97; 342/107; 342/113; 342/114; 342/115; 342/139; 342/140; 342/162

(58) Field of Classification Search .................... 342/90, 342/95–97, 107, 113–115, 139–140, 162, 342/189, 192, 194–196

See application file for complete search history.

(56) References Cited

U.S. PATENT DOCUMENTS 4,622,552 A * 11/1986 Andrews et al. ............. 342/196

(Continued)

FOREIGN PATENT DOCUMENTS

EP    0 547 686    6/1993

(Continued)

OTHER PUBLICATIONS

Markkanen J. et al: "Real-Time Space Debris Monitoring with EISCAT", Book of Abstracts, $35^{th}$ Cospar Scientific Assembly, Paris, France [Online] Jul. 18, 2004, p. 298, XP002383484 Retrieved from the Internet: URL:http://adsabs.harvard.edu/abs/2004cosp.meet.. 298M} [retrieved on May 31, 2006] Abstract.

(Continued)

*Primary Examiner*—John B Sotomayor
(74) *Attorney, Agent, or Firm*—Wood, Phillips, Katz, Clark & Mortimer (57) ABSTRACT

Moving objects are detected with a radar by collecting samples of a received signal over an integration period. The terms of a match function contain a product of a sample of said received signal and a delayed-in-time, Doppler-shifted replica of a transmission and depend on parameters that describe an object that caused a reflection of the transmission. The most probable values of the parameters are found by maximizing the match function through Fourier transforming a vector consisting of terms of the match function. Those of said products that contain a non-zero contribution of said delayed-in-time, Doppler-shifted replica of a transmission are actually computed while the others of said products are zero Only non-zero blocks of the products count as final terms to the vector to be Fourier transformed that have nonzero value while intermittent blocks that have zero value are left out. The most probable values of the parameters are those that result from Fourier transforming the vector consisting of the final terms.

14 Claims, 4 Drawing Sheets

U.S. PATENT DOCUMENTS

| | | | | |
|---|---|---|---|---|
| 5,173,706 | A | * | 12/1992 | Urkowitz .................... 342/99 |
| 5,361,072 | A | * | 11/1994 | Barrick et al. .............. 342/133 |
| 5,646,623 | A | * | 7/1997 | Walters et al. .............. 342/129 |
| 5,805,107 | A | * | 9/1998 | Schroth et al. .............. 342/189 |
| 6,232,913 | B1 | * | 5/2001 | Lehtinen .................... 342/137 |
| 6,359,584 | B1 | * | 3/2002 | Cordey et al. .............. 342/169 |
| 6,995,705 | B2 | * | 2/2006 | Bradford et al. ............ 342/95 |
| 7,379,013 | B2 | * | 5/2008 | Dean et al. .................. 342/27 |
| 2003/0222778 | A1 | | 12/2003 | Piesinger |
| 2004/0178951 | A1 | * | 9/2004 | Ponsford et al. ............ 342/192 |
| 2009/0009385 | A1 | * | 1/2009 | Lehtinen .................... 342/196 |

FOREIGN PATENT DOCUMENTS

| | | | |
|---|---|---|---|
| JP | 2009019984 A | * | 1/2009 |
| WO | WO 9949332 A1 | * | 9/1999 |
| WO | WO 2006087421 A2 | * | 8/2006 |

OTHER PUBLICATIONS

Markkanen J. et al: "Measurements of Small-size Debris with Backscatter of Radio Waves"; European Space Agency, Final Report of ESOC Contract No. 13945/99/D/CD [Online] Mar. 2002, pp. 1-30, XP002383485; Retrieved from the Internet: URL:http://ww.esa.int/gsp/completed/Exec_Sum99_N09.pdf> [retrieved on May 30, 2006] cited in the application * Section 2.2 "Statistical Inversion", p. 9-10 *.

Markkanen J et al: "Real-time space debris monitoring with EISCAT" Advances in Space Research, Pergamon, Oxford, GB vol. 35, No. 7, 2005, pp. 1197-1209, XP004984798 ISSN: 0273-1177 * Section 7. "The fast match function algorithm", p. 1207 *.

Markkanen J: "Towards Routine Real-time Space Debris Measurements with EISCAT" European Space Agency, Proceedings of the 4$^{TH}$ European Conference on Space Debris, Apr. 18, 2005,—2003 pages figure 5.

* cited by examiner

METHOD AND ARRANGEMENT FOR DETECTING MOVING OBJECTS WITH A RADAR

TECHNICAL FIELD

The invention concerns the technical field of radar measurements. Especially the invention concerns the problem of how to process the raw data from digitally sampled radar measurements into meaningful information describing moving objects with a reasonable calculational effort. An object is said to be moving if it is in motion in relation to a radar beam that is used to detect it; the term "moving objects" thus encompasses also objects that are stationary in some inertial coordinate system but which are detected with a moving radar beam.

BACKGROUND OF THE INVENTION

Using a radar to obtain information about distant, moving targets is practical in a variety of cases, including but not being limited to military surveillance, commercial airborne and seaborne navigation as well as scientific research. In this patent application we use the detection of space debris as an example. However, the same principles also apply to other kinds of radar measurements.

Space debris is a collective designation of all kinds of man-made orbital objects which no longer serve any useful purpose. Large (>10 cm) objects have known orbits and are routinely monitored by the U.S. Space Surveillance Network, but information of the smaller particles is fragmentary and mainly statistical. In order to remain in orbit an object must have a velocity of several kilometers per second in the Earth's coordinate system, which makes any such object potentially dangerous to satellites, manned spacecraft and other space-going vehicles. Exact information about space debris would help to plan space missions so that debris hazards could be minimized.

Ionospheric radars, such as the EISCAT (European Incoherent SCATter) radar system, exist that routinely perform radar measurements at altitudes that would also be of interest to space debris studies. However, these systems have been optimized for processing "soft" ionospheric reflections, and consequently are not well suited for measuring echoes from hard targets. As an example, a typical ionospheric reflection has a phase coherence time less than a millisecond, which is much shorter than the interval between consecutive transmitted pulses in a pulsed radar system (which for example in EISCAT is typically 3-10 ms). Therefore ionospheric echoes from individual pulses are uncorrelated and can only be added up in the power domain. Quite to the contrary, an echo from a hard target such as a debris object has a very long phase coherence time, in the order of several hundreds of milliseconds.

Figure 1:
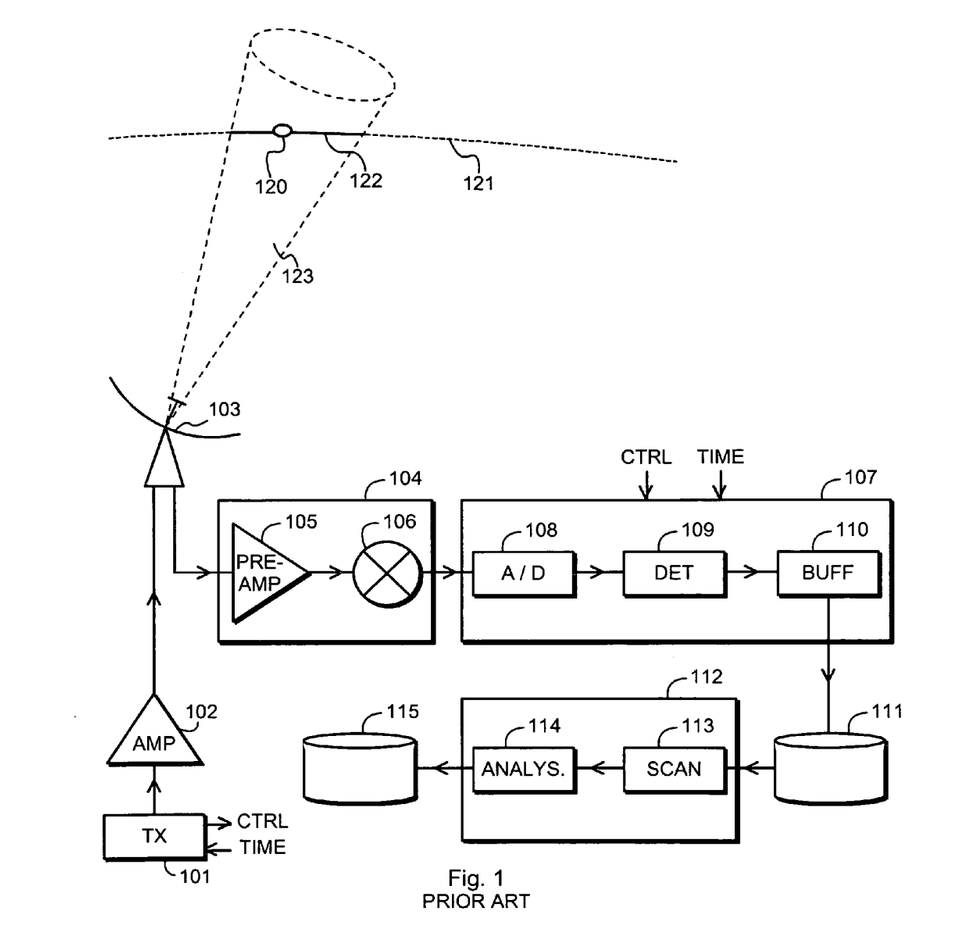
FIG. 1 illustrates a known radar system.

An approach known from the scientific report J. Markkanen, M. Lehtinen, A. Huuskonen, A. Väänänen: "Measurements of Small-Size Debris with Backscatter of Radio Waves", Final Report, ESOC Contract No. 13945/99/D/CD, March 2002 is to utilize the transmissions of a pulsed ionospheric radar but to build a separate receiving and analysis system optimized for processing echoes from hard targets. FIG. 1 illustrates a radar system for collecting information about space debris following the model suggested in said report.

Radar transmissions are formed in a transmitter computer 101, amplified in an amplifier arrangement 102 and transmitted through an antenna 103. In a monostatic radar the same antenna 103 also receives the reflected signals. Bi- and multistatic radars are also known, in which reception takes place through different antenna(s) than transmission. In an RF receiver part 104 a preamplifier 105 amplifies the received signal and a mixer 106 converts it to a lower frequency. A detector part 107 comprises an A/D converter 108, a detector 109 and a buffer 110, from which buffered data is written to a temporary data storage 111. An analysis computer 112 comprises a scanner 113 and an analyzer 114, from which analysed data is taken to a final storage 115. The transmitter and receiver branches of the system operate in a common time base obtained e.g. from a GPS (Global Positioning System) receiver to enable time-stamping the measurement results. The transmitting branch may give control information, such as transmission waveform descriptions, to the receiving branch.

We assume that a debris object 120 proceeds along an orbit 121. A part 122 of said orbit happens to go through the radar's antenna beam 123. Parameters of interest, which the radar system should give as outputs of the measurement, are mainly range (distance between the antenna 103 and the object 120), radial velocity and radial acceleration of the object 120 as well as the signal amplitude (or signal total energy) of the reflection caused by the object 120. The last-mentioned could in optimal cases be used to estimate the size of the object. The scientific report mentioned above suggests that these could be obtained by using a mathematical method based on statistical inversion.

A problem of a measurement of the kind described above has previously been the vast amount of computing and data storage that is needed if measurements are to be made and results analysed in any reasonable time, or even real time. Some basic assumptions—coherent integration over 300 milliseconds, sampling interval 0.5 microseconds—give an input data vector having 600,000 points, an FFT (Fast Fourier Transform) of which requires about 60 Mflops (Mflop=million floating point operations). An estimated range requirement of 1000 km with a reasonable 1000/0.075≈13,000 range gates multiplies this to about 800 Gflops (Gflop=billion floating point operations). At the time of writing this description, an advanced workstation equipped with appropriate software and hardware means is capable of about 1 Gflop/s performance on FFTs of this length, which means that analyzing the measurement data of 0.3 seconds would take about 800 seconds of calculation.

SUMMARY OF THE INVENTION

An objective of the present invention is to provide a method and technical means for performing radar measurements and analysis of distant moving objects in reasonable time and calculational effort. An additional objective of the invention is that applied to space debris measurements the method could take advantage of existing ionospheric radars.

The objectives of the invention are achieved by reducing the number of samples to be processed, based on the fact that only a limited Doppler velocity range needs to be considered, and by limiting the calculation of FFTs to only non-zero parts of the data vectors.

A method according to the invention is characterized by the features recited in the characterizing part of the independent claim directed to a method.

The invention applies also to a signal processing apparatus for processing received signals in a radar system. The signal processing apparatus according to the invention is characterized by the features recited in the characterizing part of the independent claim directed to a signal processing apparatus.

The invention applies also to a radar system for detecting moving targets. The radar system according to the invention is characterized by the features recited in the characterizing part of the independent claim directed to a radar system.

Additionally the invention applies to a computer program product. The computer program product according to the invention is characterized by the features recited in the characterizing part of the independent claim directed to a computer program product.

A significant difference between ionospheric radar measurements and the detection of hard targets is related to the use of frequencies. An ionospheric measurement receiver typically uses parallel frequency channels after downconversion so that an independent data stream is produced for each frequency channel. In a hard target radar, however, it is more advantageous to sample the received and downconverted signal fast enough to capture all relevant parts of the downconverted signal into a single digital data stream. This has lead to selecting a sampling frequency that may allow unambiguously resolving target velocities up to something like ±160 km/s, while it can be reasonably assumed that at least with near-vertical pointing (in space debris measurements) a radial velocity interval of ±5 km/s would be more than enough. In atmospheric radar measurements, such as military surveillance applications, the pertinent velocity interval is even narrower. Thus, the number of points in the vector to be FFT'd can be safely reduced by decimating. Although the decimation calculations come as an addition, the consequent savings in FFT calculation effort are much more significant. In the course of said decimating it can be assumed that an acceleration-dependent factor is almost constant over a small range of original data vector points, which allows taking it out of the decimation sum, reducing the number of flops even more.

Another important fact to consider is the inherently low duty cycle of the radar transmission, which means that most of the points of the data vectors that are to be FFT'd are zeroes located in regularly appearing blocks. According to the present invention the "zero blocks" can be cut out of the data vector before calculating the FFT, which may reduce the length of the data vector by as much as 90%. This in turn results in an at least similar proportional saving in the required calculation effort. The disadvantage is a certain loss in accuracy and a certain bias that is introduced to the results, but these can be accounted for partly by relying on their deterministic nature, enabling systematic compensation, and partly by noting that a particular target usually appears in the measurement data for up to several tens of integration periods, during which its radial velocity changes enough to drive the approximative calculation towards the actual, correct result.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Mathematical Derivation

The task of using a radar measurement to detect a distant moving object can be described simply as transmitting a known signal x(t) and finding the (best estimate of the) appropriate parameters of a hard target echo signal s(t) in the presence of gaussian noise γ(t). A received signal z(t) is a sum $$z(t)=s(t)+\gamma(t) \quad (1)$$

and all mentioned quantities can be treated as complex-valued (detected) waveforms.

Using statistical inversion means that we use a parameterized model for the signal s(t) and find the most probable signal among a number of model signals, given the measured signal z(t).

Before making further assumptions about the model signals we only assume that a model signal depends linearly on the complex amplitude b and nonlinearly on some other parameters, which are collectively denoted by θ. In other words, our assumption about the correct, noise-free target echo signal has the form $$s(t)=b\cdot\chi(\theta;t). \quad (2)$$

We sample the received signal z(t) using a sampling interval τ and get $N_c$ samples during a time interval $T_c$, called the integration time. The group of $N_c$ samples is a "measurement".

Intuitively it makes sense that some of the model functions, i.e. some of the possible parameter sets (b,θ), are more likely than others to explain a given measurement, in a way that depends on the received signal z(t). Statistical inversion means that the most probable value of the parameters is found in a systematical way. It can be shown that this problem amounts to finding the estimates $(\hat{b},\hat{\theta})$ that minimize the least-squares norm $$(\hat{b}, \hat{\theta}) = \operatorname*{argmin}_{b,\theta}\|z - b\cdot\chi(\theta)\|. \quad (3)$$

Geometrically it can be thought that the set of all possible model vectors bχ(θ) constitute a subset of a complex vector space having as many dimensions as there are parameters in θ. The best-fitting model function is the one for which the corresponding model vector is closest to, i.e. the most parallel with, the given received signal vector z. We may define a match function MF as $$MF(\theta) = \frac{|\langle z, \chi(\theta) \rangle|}{\|\chi(\theta)\|}. \tag{4}$$

The best set of parameters θ, i.e. the best estimate $\hat{\theta}$, is the one which maximizes the match function MF:

$$\hat{\theta} = \underset{\theta}{\operatorname{argmax}} MF(\theta). \tag{5}$$

The energy of a complex-valued signal is obtained by multiplying the squared norm of the signal with the sampling interval. The energy of an estimated signal is the square of the maximum of the match function. Thus the match function method of parameter estimation can be summarized with two steps:
  the nonlinear parameters θ are obtained by locating the position of the MF maximum in the parameter subspace
  the signal energy is obtained as the square of the value of the MF maximum.

Figure 2:
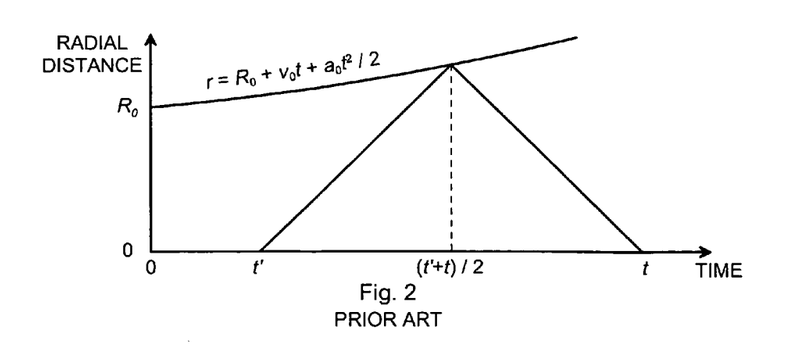
FIG. 2 illustrates radial distance of a target as a function of time.

Next we will specify that the nonlinear parameters θ are radial distance R, radial velocity v and radial acceleration a. We assume that at the time t=0 a solid target with a constant radar cross-section was located in the antenna beam at a distance $R_0$ from the antenna of a monostatic radar and moving with a radial velocity $v_0$ and a constant radial acceleration $a_0$. A graphical illustration of the target's radial distance is shown in FIG. 2.

Assuming that the propagation velocity of the radar signal is c, for any given target radial motion r(t) the delayed time for reflection from a point target is determined by $$t - t' = \frac{2r\left(\frac{t'+t}{2}\right)}{c}. \tag{6}$$

With constant radial acceleration, the radial distance r is $$r = r(R_0, v_0, a_0; t) = R_0 + v_0 t + \frac{1}{2} a_0 t^2. \tag{7}$$

For the motion of (2), equation (1) is quadratic in t'. Solution of the equation for the pulse propagation time t-t', with the appropriate choice of the sign of the square root, is $$t - t' = \frac{2c}{a_0}\left\{1 + \frac{v_0}{c} + \frac{a_0}{c}t - \left[1 + \frac{2v_0}{c} + \left(\frac{v_0}{c}\right)^2 + \frac{2a_0}{c}\left(t - \frac{R_0}{c}\right)\right]^{\frac{1}{2}}\right\}. \tag{8}$$

Equation (3) can be simplified by expanding the square root to a power series. Care must be exercised regarding to which terms can be dropped from the expansion. Considering again the space debris example and parameter values typical to an EISCAT UHF measurement in a near vertical direction,
  $R_0 \approx 10^6$ m,
  $V_0 \approx 10^3$ ms$^{-1}$,
  $a_0 > 10^2$ ms$^{-2}$,
  $\omega_1 \approx 6 \cdot 10^9$ Hz,
where $\omega_1$ is a carrier frequency of the radar signal, all terms following the "1" inside the square brackets in equation (3) are quite small compared to unity. A person skilled in the art can easily make a corresponding approximation for systems where the fundamental parameters are different.

What actually determines which terms X we need to keep is the requirement that the reflected wave's corresponding phase angle $\phi_X = \omega_1 2cX/a_0$, where $\omega_1$ is the radar transmission frequency, must have the opportunity to change appreciably during the integration time. Taking the first three lowest order terms of the power series expansion of $[1+(\ldots)]^{1/2}$, and then disregarding the individual terms which are essentially constant—say all terms for which $\phi_X$ stays smaller than 0.1 rad when integration time is less than a second—we are left with $$t - t' \approx \frac{2}{c}\left[R_0 + v_0 t + \frac{1}{2} a_0 t^2 - (v_0 + a_0 t)\frac{R_0}{c}\right] \tag{9}$$

$$= \frac{2}{c}\left[R_0 + v_0\left(t - \frac{R_0}{c}\right) + \frac{1}{2}a_0\left(t - \frac{R_0}{c}\right)^2\right] \tag{10}$$

$$= \frac{2}{c} r\left(R_0, v_0, a_0; t - \frac{R_0}{c}\right) \tag{11}$$

Concerning the general applicability of the invention to the remote sensing of all kinds of moving targets, the consideration about which terms to keep should be made separately taking each particular set of physical conditions into account. Equation (10) above is actually a Taylor's series development that describes the motion of the target when certain assumptions hold that are typical to the exemplary case of detecting space debris. If some other assumptions can be made about the range, velocity, acceleration and/or some other parameter of the target's motion, it may well be that different and/or more terms of the corresponding Taylor's series must be taken into the calculations.

For the purposes of the invention it is not necessary to derive the Taylor's series through exactly that way which has been presented above as an example. It is within the capability of a person skilled in the art to make and apply the other assumptions that might apply in a different physical situation and to derive the corresponding Taylor's series. However, for the sake of consistency and ease of understanding we continue in the following to rely on the exemplary assumptions made above.

The term $-R_0/c$ is a natural first order correction to the time instant of pulse reflection; the only non-trivial aspect is that this correction already is sufficient (for our typical measuring configurations). To a good approximation we can thus express the model functions χ(R, v, a; t) to be used in the MF-computation (see equation (4)), in terms of the transmission sample signal x(t) as $$\chi(R, v, a; t) = x\left(t - \frac{2}{c} r\left(R, v, a; t - \frac{R}{c}\right)\right) \tag{12}$$

Nothing has been assumed about the transmission in this derivation so far. In principle, as long as the transmission can be accurately measured via the trans-mission sample signal (see e.g. the control connection in FIG. 1), we do not even need to know what transmission has been used; the MF-machinery incorporates the transmission transparently. This is an advantage considering automated piggyback measurements, for example if the invention is applied for space debris monitoring as an add-on to ionospheric radar systems such as the EISCAT.

This having been said, a fact that must be considered is that the radar's noise environment is often poorly approximated by any assumption that it would consist only of stationary gaussian noise. All kind of distortions happen in practice, one of them being the ionosphere becoming visible as clutter in the data. More or less ad hoc, manual, experiment-specific solutions have been used to account for these problems. Also, the antenna pointing may change during a measurement; for example many EISCAT measurements use cyclical antenna pointing schemes.

Next we assume that the transmission x(t) can be described as $$x(t) = \epsilon(t)\exp(i\omega_1 t) \tag{13}$$

where $\omega_1$ is the carrier frequency, and the transmission envelope $\epsilon(t)$ is a slowly changing function describing for example binary phase modulation, as is often the case in ionospheric radar measurements that can be used as "carriers" for space debris studies, for example in EISCAT. This description is good for a single frequency channel transmission. We ignore the correction $-R/c$ to the pulse reflection time in equation (12) and use the special form of equation (13) to write the model function as $$\chi(t) \approx \epsilon\left(t - \frac{2}{c}r(t)\right)\exp\left(i\omega_1\left(t - \frac{2}{c}r(t)\right)\right) \tag{14}$$

Inside the slowly varying transmission envelope we can assume that r(t) stays equal to a constant value R during the integration time. Then, from equations (14) and (13), $$\chi(t) \approx \epsilon\left(t - \frac{2R}{c}\right)\exp\left[i\omega_1\left(t - \frac{2}{c}R\right)\right]\exp\left[i\left(-\omega_1\frac{2}{c}v\right)t + i\left(-\omega_1\frac{a}{c}\right)t^2\right] \tag{15}$$

$$= x\left(t - \frac{2R}{c}\right)\exp[i(\omega_D t + \alpha_D t^2)],$$

where $$\omega_D = -\omega_1\frac{2v}{c} \text{ and } \alpha_D = -\omega_1\frac{a}{c}$$

are the Doppler frequency and the rate of change of the Doppler frequency (=the "Doppler drift") respectively. The approximation of equation (15) is often used in the literature (even without the drift term) and is explained by stating that the received signal is a delayed-in-time, Doppler-shifted replica of the transmission. With this model, the match function definition of equation (4) can be expanded for continuous-time signals, as $$MF(R, v, a) = \frac{\left|\int_0^{T_c} z(t)\bar{x}\left(t - \frac{2R}{c}\right)\exp[-i(\omega_D t + \alpha_D t^2)]dt\right|}{\sqrt{W_x}}, \tag{16}$$

where $W_x = \int |x(t)|^2 dt$ is the energy of the transmission sample signal and the line above x means taking a complex conjugate.

For signal vectors we need to take into account that the transmission samples are only available at times $n\tau_s$, where n is a positive integer. This already forces us to discretize the range variable. With $$R_j = j\frac{c\tau_s}{2} \tag{17}$$

the match function becomes $$MF(R, v, a) = \frac{\left|\sum_{n=0}^{N-1} z_n \bar{x}_{n-j}\exp[-i(\omega_d n + \alpha_d n^2)]\right|}{\|x\|} \tag{18}$$

where the normalized Doppler shift and normalized Doppler drift are $$\omega_d = -\omega_1\tau_s\frac{2v}{c}, \tag{19}$$

$$\alpha_d = -\omega_1\tau_s\frac{a\tau_s}{c} \tag{20}$$

respectively. At the points $$v_k = k\frac{c}{\omega_1 T_c} \tag{21}$$

equation (18) can be written $$MF(R_j, v_k, a) = \frac{\left|\sum_{n=0}^{N-1}(z_n \bar{x}_{n-j}\exp(-i\alpha_d n^2))\exp\left(-i\frac{kn}{N}\right)\right|}{\|x\|} \tag{22}$$

which shows that at these points the MF can be evaluated using FFT. The denominator $\|x\|$ is the square root of the transmission sample energy, and is of course independent of the parameters R, V and a.

In general, the radial acceleration a is unknown. However, in special cases like space debris studies we may utilize the fact that debris objects orbit the Earth, so the radial acceleration depends on the form and height of the orbit as well as the antenna pointing direction. Assuming vertical antenna pointing and circular orbits $$a = g_0 \frac{R_E}{h}\left(\frac{R_E}{R_E + h}\right)^2, \tag{23}$$

where $R_E$ is the Earth radius (6360 km), $g_0$ is the acceleration of gravity at zero altitude (9.8 m/s$^2$) and h is the target altitude. Experimentation with data has shown that not much sensitivity is lost in practice even if the acceleration is not varied. In routine analysis, therefore, it suffices to search for the MF maximum only over the $(R_j, v_k)$-grid. If the acceleration is to be found out separately, it can be included as an additional parameter to the MF maximization problem, which naturally makes the optimization calculations somewhat more complicated.

The mathematical analysis so far has described essentially known features of applying statistical inversion to the detection of distant moving objects with radar. If no further approximations are made, a prior art analysis computer using the methods describing above would run into the difficulties caused by the large calculational effort, as was explained in the description of prior art. In the following we introduce a fast (although admittedly approximative) way of evaluating the match function. We will designate the following process as the fast match function (FMF) algorithm.

First, we may note that the aim of covering all useful frequencies with a single A/D conversion and a sufficiently high sampling rate actually results in a much higher sampling rate than what is needed to unambiguously resolve the physically possible range of radial velocities. For example, for a commonly used 930 MHz radar frequency (corresponding to a wavelength of 0.32 m) a sampling rate of 2 MHz gives unambiguous velocities in the interval $\pm(f_s/2)\cdot(\lambda/2)=\pm 160$ km/s, whereas for near-vertical antenna pointing it is amply sufficient to monitor only the velocity interval ±5 km/s. Therefore we may downsample (decimate) the to be Fourier-transformed vector w in equation (22)

$$w_n = z_n \bar{x}_{n-j} \exp(-i\alpha_d n^2) \tag{24}$$

by as much as $M_{dec}=160/5=32$. Typically we use $M_{dec}=15$ and form the decimated vector w' by adding consecutive $w_n$ values in blocks of $M_{dec}$. At the same time we make use of the fact that within such a block the acceleration factor $\exp(-i\alpha_d n^2)$ is almost constant. We take it out of the decimation sum to reduce both the number of multiplications and the number of complex exponentials that need to be computed.

Figure 3:
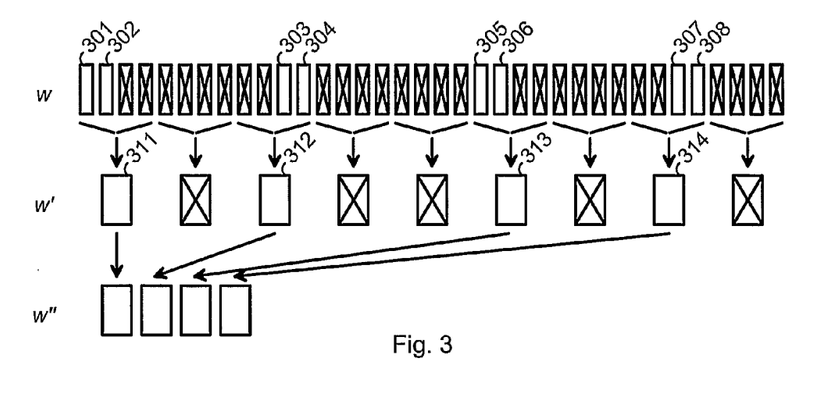
FIG. 3 illustrates the procedure of decimating and condensing a vector to be Fourier transformed.

Second, we make use of the fact that most of the $w_n$ values are zeros. The transmission duty cycle of a pulsed radar is not 100% but less, for example in the order of 10% in EISCAT UHF radar experiments. Therefore about 90% of the transmission samples $x_n$ are zeros (contain no transmission), in regularly placed blocks. Each $w_n$ is a product (see equation (24) and thus needs to be computed and decimated only for the non-zero $x_n$. FIG. 3 illustrates this schematically with significantly underestimated numbers of vector elements for reasons of graphical clarity. The topmost line of blocks represents the vector w, where only the non-crossed vector elements 301-308 are non-zero and need to be computed. A decimation with $M_{dec}=4$ yields a vector w', again with non-zero element blocks at locations 311, 312, 313 and 314 where the decimation sum contained also others than just zero elements from the vector w''.

The crucial time-saver step is to ignore the zeros also when collecting the decimated products into a final FFT input vector w''. We just concatenate the non-zero blocks, without inserting any intertwining blocks of zeros, as is illustrated at the lowest line in FIG. 3. The FMF formula is $$FMF(R_j, v_k, a) = \frac{\left|\sum_{n=0}^{N''-1} w_n'' \exp\left(-i\frac{kn}{N}\right)\right|}{\|x\|}. \tag{25}$$

The vector w'' is typically two orders of magnitude shorter than w. In the benchmark case discussed earlier, w'' has a length $N''=(1/15)\,0.1\,600{,}000=4000$. Due to the much shorter FFT input vector, even allowing for the extra work due to the decimation, in typical cases the FMF is 100-300 times faster than the standard MF.

That we gain speed by the FMF-algorithm is not in doubt. But what is the price? Decimation, the first step in the algorithm, causes only little loss of information. Basically, we are just backtracking from our initial "oversampling". We can backtrack at this stage but not earlier, because the vector w is near zero frequency while the raw data vector z, for a multi-frequency transmission, is not. In Eq. (24), each frequency channel in z gets multiplied by the complex conjugate of the corresponding transmission, so the carriers of all frequency channels (approximately) cancel out simultaneously. Very near the MF maximum, also a possible phase modulation is cancelled out. So the sampling requirement of w is determined by the size of the anticipated maximum Doppler shift only.

We now inspect the second step. What effect does the throwing-away of blocks of zeros have to the result of the Fourier-transform? We ignore here the somewhat trivial decimation step. We require the match function only near its maximum, so we assume that correct range and acceleration have been found and the corresponding phase factors cancelled out from the vector ($w_n$), and only a Doppler-term $\exp(i\omega_0 n)$, where $\omega_0$ is the target's normalized Doppler-shift, still remains. We will also ignore noise, so we are actually computing what we might, for consistency of nomenclature, call the fast ambiguity function, FAF.

We assume single-frequency transmission, consisting of M pulses, of L samples each, transmitted using interpulse period of P samples. Then, near the maximum, w consists of M boxcar pulses of, say, unit amplitude and L samples each, Doppler-shifted by $\omega_0$, with P-L zeros between each pair of pulses. The non-zero part of w consists of M blocks, and in the m'th block, the $w_n$ take values $$w_n^{(m)} = \exp[i\omega_0(n+mP)], n=0,\ldots,L-1. \tag{26}$$

For computing $FAF(\omega)$, the blocks $\{w_n^{(m)}\}$ are first concatenated and then multiplied by $\exp(-i\omega n)$. The m:th block gets multiplied by $$u_n^{(m)} = \exp[-i\omega(n+mL)], n=0,\ldots,L-1. \tag{27}$$

The contribution $l^{(m)}$ of the m:th block to the inner product in the nominator of equation (25) is $$l^{(m)} = \sum_{n=0}^{L-1} w_n^{(m)} \cdot u_n^{(m)}. \tag{28}$$

The norm $\|x\|$ in the denominator of equation (25) is a sum of M times L terms all equal to unity, so we get from equations (25) and (28)-(26)

$$FAF(\omega) = \frac{1}{ML}\left|\sum_{m=0}^{M-1} l^{(m)}\right| \tag{29}$$

$$= \frac{1}{ML}\left|\sum_m \sum_n \exp[i\omega_0(n+mP)]\exp[-i\omega(n+mL)]\right| \tag{30}$$

$$= \frac{1}{L}\left|\sum_{n=0}^{L-1} \exp[i(\omega_0-\omega)n]\right| \cdot$$
$$\frac{1}{M}\left|\sum_{m=0}^{M-1} \exp[i(\omega_0 P - \omega L)m]\right| \tag{31}$$

$$= diric(\omega_0 - \omega, L) \cdot diric(\omega_0 P - \omega L, M), \tag{32}$$

where we have defined the Dirichlet kernel "diric" by $$diric(x, M) = \left|\frac{\sin(xM/2)}{M\sin(x/2)}\right|. \tag{33}$$

The first factor in the expression (32) encodes the Doppler velocity information available from a single pulse. The factor has an absolute maximum at the target's Doppler frequency $\omega_0$, while the zeros nearest to the maximum are at $\omega_{\pm}=\omega_0\pm 2\pi/L$. The second factor in the expression (32) results from pulse repetition. It has maxima, all equal to unity, at the points $$\omega_n = \frac{P}{L}\omega_0 + n\frac{2\pi}{L}. \tag{34}$$

In general, none of the maxima con coincides with $\omega_0$. Therefore the maximum of FAF($\omega$) is not situated at the expected place $\omega_0$. This means that the estimated velocity is biased. This is not serious, because the bias is rather small, less than 0.2 km/s in the normal measurement modes associated with applying the invention to space debris studies with EISCAT radars.

Potentially more problematic for target detection is the reduction of the FMF maximum value compared to the MF maximum value. Some loss of the integrated signal amplitude is to be expected, for the FMF is no more the optimal solution to the estimation problem. The amount of reduction depends on the target velocity. The reduction vanishes for some target velocities, but an even more useful property is that the reduction has an upper bound, and the bound is reasonably small. The maximum value of the FAF occurs near that $\omega_n$ which is nearest to $\omega_o$. Such an $\omega_n$, according to Eq. (34), is never further away from $\omega_o$ than half the spacing $2\pi/L$ between the $\omega_n$. Therefore, the FAF maximum value in the worst case is roughly equal to diric($\pi/L$, L), or 64% of the ideal value. This result applies to the single-frequency case. For the slightly more complicated case of multiple frequencies an upper bound still exists and can be derived through similar considerations.

Often we can observe a target for a few seconds during its beam passage, and during that time, its velocity typically varies so much that for some integration, it is near a "good" value where the FMF maximum is near the MF maximum. This explains why in practice it seems possible to achieve almost the same detection sensitivity with the FMF as with the MF. The main difference is that detection with the FMF proceeds more than a hundred times faster.

Measurement and Analysis Apparatus

Figure 4:
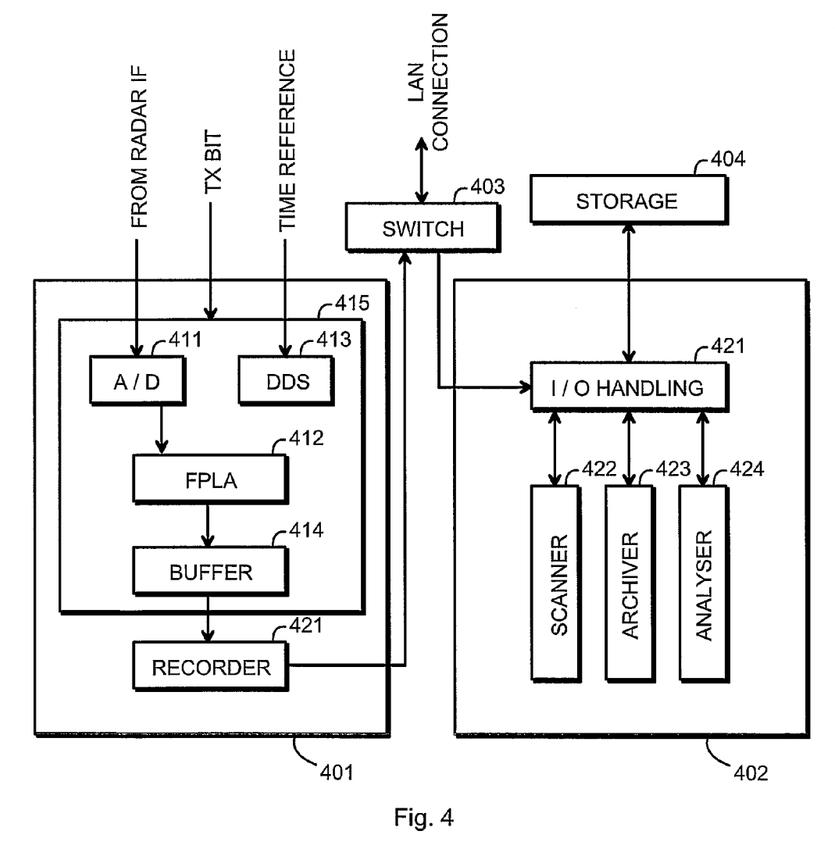
FIG. 4 illustrates an apparatus according to an embodiment of the invention.

FIG. 4 illustrates a measurement and analysis apparatus according to an embodiment of the invention. The task of recording and analyzing measurement data is distributed to two computers, designated as the measurement computer 401 and the analysis computer 402. Other parts of the apparatus shown in FIG. 4 are a switch 403 used for arranging communications and a storage (hard disk) arrangement 404. The apparatus is adapted to execute the method of FIGS. 5 and 6, which can also be interpreted so that the apparatus comprises a computer program product, stored on a machine-readable medium, which at the time of running in the programmable means of FIG. 4 cause the execution of the steps of said method.

An analog intermediate frequency signal from a radar's reception branch comes to an A/D converter 411 in the measurement computer for conversion into digital representation. Assuming that the apparatus is used for space debris studies in association with the EISCAT system, we may note that the intermediate frequency signal also contains, in a time-multiplexed manner, the transmission sample signal. In the EISCAT system the time multiplexing is controlled by the so-called TX bit generated by the radar controller microprocessor. As is illustrated in FIG. 4, the TX bit is also recorded in the measurement computer to mark out the transmission blocks. An exemplary way to store the TX bit is to record it as the least significant bit of the imaginary part of the 16+16 bit complex integer data words. With this arrangement the transmission sample signal gets automatically sampled with the same sampling rate as the actual reception. Actually a higher sampling rate would be preferable, so a further development of the system might contain an arrangement for increasing the sampling rate for the transmission sample signal.

Figure 5:
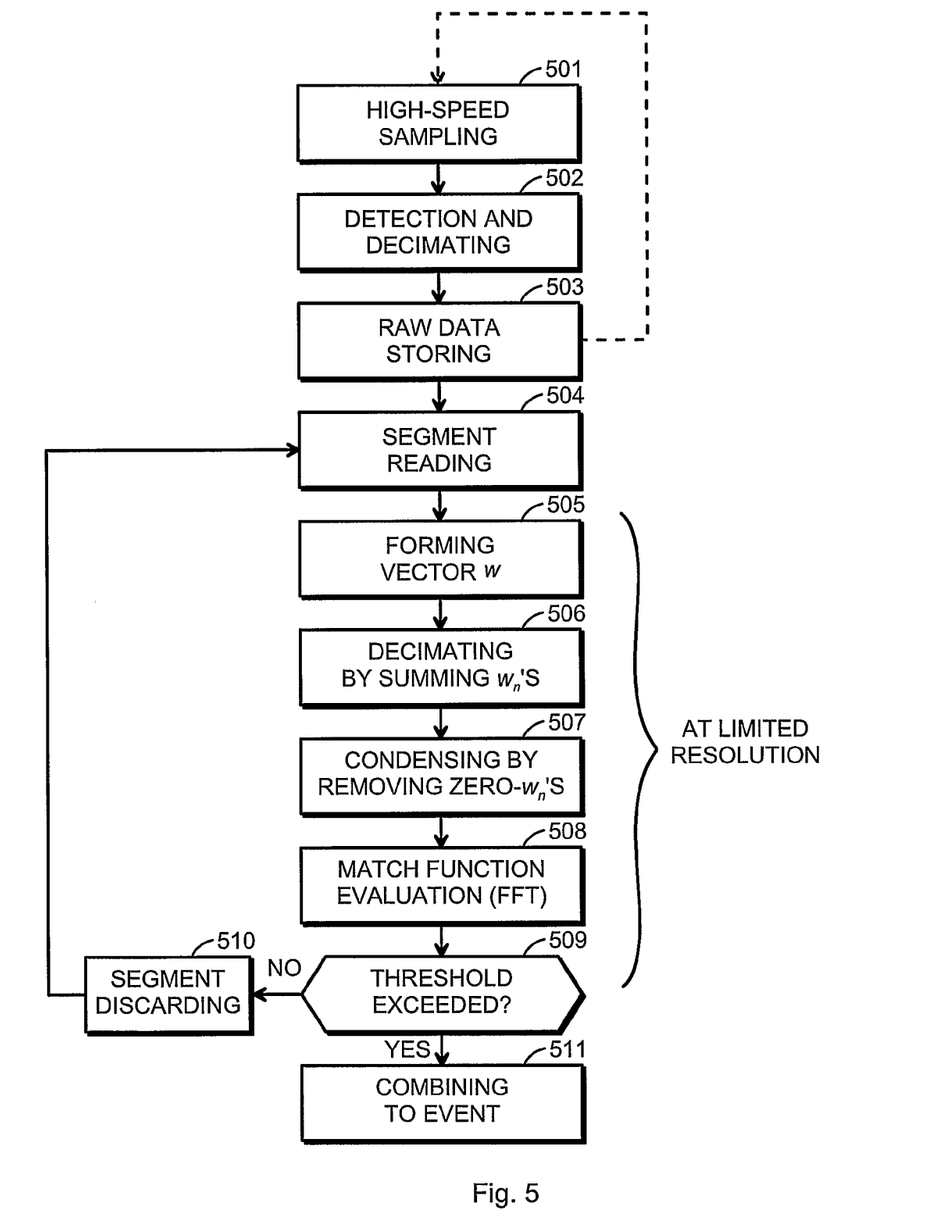
FIG. 5 illustrates a part of a method and a computer program product according to an embodiment of the invention.

In an exemplary system according to FIG. 4 the A/D converter 411 samples the incoming intermediate frequency signal at 40 MHz, which in FIG. 5 corresponds to step 501. The resulting real-valued sample stream is processed by a programmable logic chip 412 to perform quadrature detection, essentially by doing a Hilbert transform. The result of the transform is a complex-valued 10 MHz sample stream, which represents the negative frequency part of the spectral contents of the analog input. The programmable logic chip 412 then decimates the 10 MHz stream to the final sampling rate. A typical decimation factor M is 20, which yields a 500 kHz final sampling rate. The decimation is done by adding samples in blocks of M; this ensures that the filtering is properly matched to the final sampling rate. Detection and decimating appear as step 502 in FIG. 5.

It may be noted that there is no separate multiplication (mixing) to baseband in this scheme. Instead, the customary frequency component in baseband is created by the under-sampling. With 40 MHz raw sampling, the arrangement requires that the band-limited analog input is centered at 10 MHz. Although it is possible to make the A/D converter 411 operate at other sampling rates, the 40 MHz is a most convenient choice. Again thinking of the space debris study example, the fact that the two most often used EISCAT frequencies have been 10.1 MHz and 9.8 MHz, which map as near to the zero frequency as can be hoped for in this processing scheme, is an advantage. An alternative offering more flexibility concerning the frequencies would be to have a complex mixer built in the measurement computer 401.

A frequency reference comes to a DDS (Direct Digital Synthesis) block 413 in order to maintain correct frequencies in the sampling and decimation processes. In this exemplary embodiment the A/D converter 411, the programmable logic chip 412, the DDS block 413 and an output buffer 414 are all located on a custom-built board 415 coupled to an internal bus of the measurement computer 401.

The measurement computer 401 and the analysis computer are connected to each other via a gigabit Ethernet link. Most advantageously there is also a connection to the host site's LAN through the switch 403 that organizes the Ethernet link. A recorder program 421 in the measurement computer 401 reads the samples from the buffer 414 and writes them to the hard disk storage 404; see step 503 in FIG. 5. In a typical measurement, data accumulation rate to the hard disk 404 is between 7 and 30 Gbytes per hour, depending on the sampling rate. The LAN connection is useful for example to access a time base that is used to synchronise the local time in the measurement and analysis computers. Accurate timing is needed e.g. for time-stamping detected events.

Data analysis is done on the analysis computer 402, where an input and output data handling routine 421 routes data according to need. First, a scanner 422 reads a segment (typically 300 ms) of raw data from the storage 404, and searches through the segment for hard targets, using threshold detection within the framework of the match function method. Reading a segment corresponds to step 504, and the execution of the match function method comprises, among others, the forming of the vector w at step 505, decimating it at step 506 and condensing the decimated result at step 507 by removing the zero-valued vector elements. The actual evaluation of the match functions appears as step 508. The resulting estimated parameter values are subjected to threshold detection at step 509. Not exceeding the threshold means that the analysed radar signal did not contain recognizable hard target echoes, and the segment is discarded at step 510.

When the threshold is exceeded, there is said to be a hit. The scanner 422 saves the hit's description to a file, and proceeds for next data segment. A second program, the event archiver 423, inspects the list of hits and combines to an event the hits that correspond to a single target passing through the radar beam (step 511 in FIG. 5). Having determined the time boundaries of the event, the archiver 423 copies raw data belonging to the event to a separate directory and goes on looking for more events. Finally, an analyser 424 picks events from the event directories and deduces and saves the event parameters.

By far the most time-consuming step in the data analysis is the scanning. According to an advantageous embodiment of the invention, scanning is done by a c-program that makes use of an vector processor onboard the analysis computer, by calling routines in a DSP (Digital Signal Processing) library, most especially the FFT routine.

The event archiver 423 is also most advantageously a c-program, but it is not performance critical. Most of its time goes to data copying, so the speed is mainly limited by disk speed at the storage 404. In routine measurements, at most the raw data of events will be saved. With the event rates observed in test measurements, saving all events from for example 400 hours of space debris measurements would require (only) in the order of a terabyte of storage per year.

Figure 6:
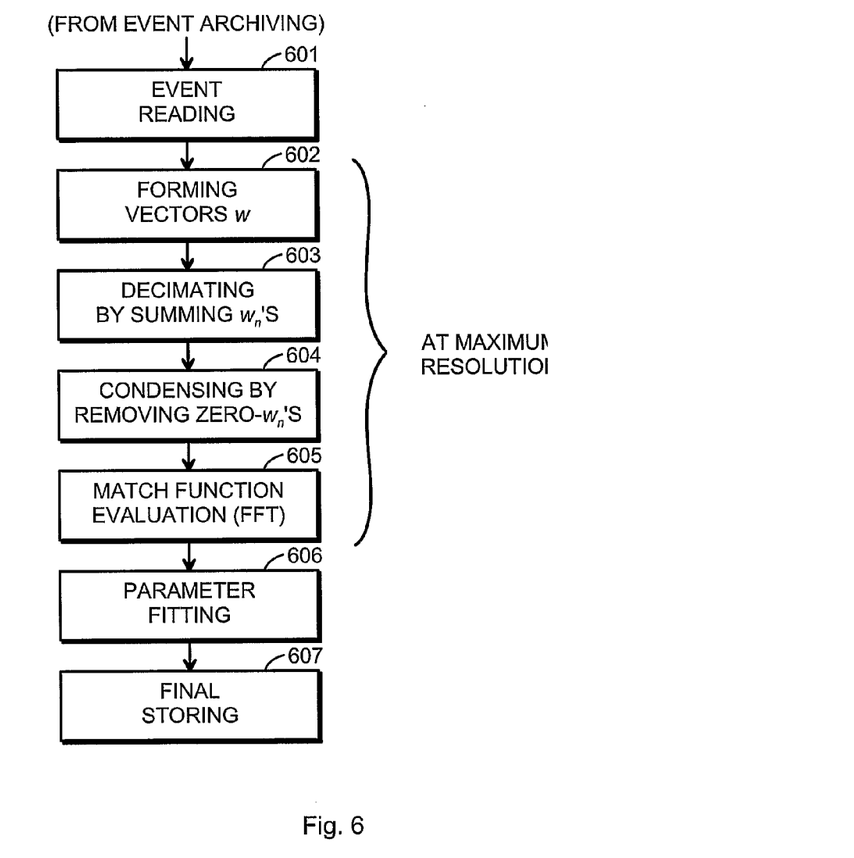
FIG. 6 illustrates a part of another method and a computer program product according to an embodiment of the invention and
FIG. 7 illustrates a detail of a method and a computer program product according to an embodiment of the invention.

The task of the analyzer 424 is to compute the final target parameters. This can be accomplished for example by calling the scanner 422 to rescan the data after having read an event at step 601. Essentially the same calculations are made at steps 602-605 as at steps 505-508 of FIG. 5, but with maximal time and range resolution but over a narrow range interval. This results in a number of parameter estimates, each being derived from one hit of a stored event, that together constitute a time series within the time boundaries of the event. Step 606 corresponds to making linear or quadratic fits to the range and Doppler velocity time series, and step 607 represents storing the final values. In the exemplary configuration the analyzer 424 is a Matlab program, but it can be implemented also in more machine-oriented programming languages like c.

Figure 7:
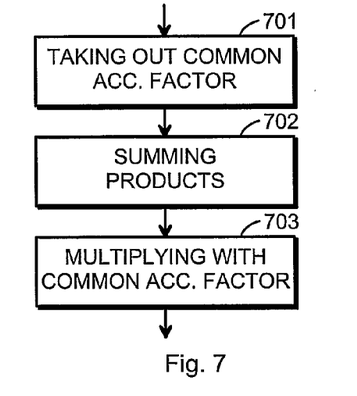

FIG. 7 illustrates schematically the practice of saving computations in the decimation step 506 or 603 by taking out the common acceleration factor at step 701, summing the products $z_n \bar{x}_{n-j}$ at step 702 and multiplying the complete sum with the common acceleration factor at step 703.

The overall processing speed of an exemplary configuration like that shown in FIG. 4 is such that for data taken with 2 MHz sampling rate, it takes 40-45 minutes to scan, archive and analyse one hour of raw data, while keeping the raw data access running at the same time. This simultaneous running of the raw data access routine is illustrated with a dashed loop arrow in FIG. 5.

The invention claimed is:

1. A method for detecting moving objects with a radar, comprising:
   receiving reflections of a pulsed radar transmission, said reflections constituting a received signal,
   collecting samples of the received signal over an integration period,
   forming a match function, the terms of which contain a product of a sample of said received signal and a delayed-in-time, Doppler-shifted replica of a transmission and depend on parameters that describe an object that caused a reflection of the transmission, and
   finding most probable values of the parameters by maximizing the match function through Fourier transforming a vector consisting of terms of the match function;
   characterized in that in order to compose the vector to be Fourier transformed it comprises:
   computing those of said products that contain a non-zero contribution of said delayed-in-time, Doppler-shifted replica of a transmission, and letting others of said products be zero, thus forming preliminary terms of the vector to be Fourier transformed,
   forming blocks of said preliminary terms,
   taking those of said blocks as final terms to the vector to be Fourier transformed that have nonzero value, by preserving the mutual order of said nonzero-valued blocks but leaving out intermittent blocks that have zero value, and
   outputting, as said most probable values of the parameters, those values that result from Fourier transforming the vector consisting of said final terms.

2. A method according to claim 1, characterized in that said forming of blocks of said preliminary terms comprises decimating a vector consisting of said preliminary terms, by summing together groups of consecutive preliminary terms.

3. A method according to claim 2, characterized in that it comprises:
   taking an acceleration factor of a group of preliminary terms to be constant within said group of preliminary terms,
   summing non-constant parts of said group of preliminary terms and
   multiplying the summed non-constant parts of said group of preliminary terms by said acceleration factor.

4. A method according to claim 1, characterized in that it comprises receiving a transmission sample signal multiplexed in time with said reflections of a pulsed radar transmission, and using said transmission sample signal to represent said delayed-in-time, Doppler-shifted replica of a transmission.

5. A method according to claim 1, characterized in that it comprises receiving reflections of a pulsed radar transmission used for other radar measurement than said detection of moving objects, thus piggy-backing the detection of moving objects onto said other radar measurement.

6. A method according to claim 5, characterized in that it comprises detecting space debris objects by receiving reflections of pulsed radar transmissions used for scientific research of the Earth's ionosphere.

7. A method according to claim 1, characterized in that it comprises maximizing the match function $$MF(R_j, v_k, a) = \frac{\left| \sum_{n=0}^{N-1} (z_n \bar{x}_{n-j} \exp(-i\alpha_d n^2)) \exp\left(-i\frac{kn}{N}\right) \right|}{\|x\|}$$

by Fourier transforming a vector w'' obtained from the vector $$w_n = z_n \bar{x}_{n-j} \exp(-i\alpha_d n^2)$$

by decimating and only preserving non-zero blocks resulting from said decimating;
wherein $R_j$ denotes a j:th radial range bin,
   $v_k$ denotes a k:th radial velocity bin,
   a denotes the radial acceleration of a reflecting object,
   $z_n$ is the n:th sample of a received signal z, $\bar{x}_{n-j}$ is the complex conjugate of the n-j:th sample of a transmission signal x, i is the imaginary unit, $\alpha_d$ is the normalized Doppler drift caused by a reflecting object moving with radial acceleration, n is a summing index, k is a velocity index, N is the number of samples taken of the received signal during an integration period and $\|x\|$ is the square root of transmission sample energy.

8. A signal processing apparatus for processing received signals in a radar system, comprising:

an input adapted to receive samples collected of a received signal over an integration period, and a scanner adapted to form a match function, the terms of which contain a product of a sample of said received signal and a delayed-in-time, Doppler-shifted replica of a transmission and depend on parameters that describe an object that caused a reflection of the transmission, said scanner being additionally adapted to find most probable values of the parameters by maximizing the match function through Fourier transforming a vector consisting of terms of the match function;

characterized in that:

the scanner is adapted to compute those of said products that contain a non-zero contribution of said delayed-in-time, Doppler-shifted replica of a transmission, and to let others of said products be zero, in order to form preliminary terms of the vector to be Fourier transformed, the scanner is adapted to form blocks of said preliminary terms, the scanner is adapted to condense a vector consisting of said blocks by pre-serving the mutual order of nonzero-valued blocks but leaving out intermittent blocks that have zero value, in order to produce a condensed vector and the scanner is adapted to output, as said most probable values of the parameters, those values that result from Fourier transforming the condensed vector.

9. A signal processing apparatus according to claim 8, characterized in that the scanner is adapted to compare said most probable values of the parameters to a threshold and to store such outputted most probable values that exceed said threshold as a hit.

10. A signal processing apparatus according to claim 9, characterized in that it comprises an even archiver adapted to combine to an event the hits that appear to correspond to a single target passing through a radar beam.

11. A signal processing apparatus according to claim 10, characterized in that it comprises an analyzer adapted to compute final target parameters by calling the scanner (422) to rescan data of an event (601) with maximal time and range resolution and by making a fits to a time series of parameter values resulting from such rescanning.

12. A radar system for detecting remote moving objects, comprising:

a radar receiver adapted to receive reflections of a pulsed radar transmission and to produce a received signal, a sampler and sample collector adapted to collect samples of the received signal over an integration period, a processing unit adapted to form a match function, the terms of which contain a product of a sample of said received signal and a delayed-in-time, Doppler-shifted replica of a transmission and depend on parameters that describe an object that caused a reflection of the transmission, and adapted to find most probable values of the parameters through maximisation of the match function through Fourier transforming a vector consisting of terms of the match function;

characterized in that:

the processing unit is adapted to compute those of said products that contain a non-zero contribution of said delayed-in-time, Doppler-shifted replica of a transmission, and to let others of said products be zero, to form preliminary terms of the vector to be Fourier transformed, the processing unit is adapted to form blocks of said preliminary terms, the processing unit is adapted to take those of said blocks as final terms to the vector to be Fourier transformed that have nonzero value, through preserving the mutual order of said nonzero-valued blocks but leaving out intermittent blocks that have zero value, and the radar system comprises an output adapted to output, as said most probable values of the parameters, those values that result from Fourier transforming the vector consisting of said final terms.

13. A radar system according to claim 12, characterized in that it comprises a radar transmitter adapted to transmit said pulsed radar transmissions.

14. A computer program product comprising machine-readable instructions that, when executed in a computer, implement the method of claim 1.

* * * * *